US009509902B1

(12) United States Patent  
Barron et al.

(10) Patent No.: US 9,509,902 B1  
(45) Date of Patent: Nov. 29, 2016

(54) METHODS AND DEVICES FOR CORRECTION OF CAMERA MODULE SENSITIVITY AND FLASH COLOR VARIATION

(71) Applicant: Microsoft Technology Licensing, LLC, Redmond, WA (US)

(72) Inventors: Euan Barron, Tampere (FI); Jarkko Pekkarinen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/735,720

(22) Filed: Jun. 10, 2015

(51) Int. Cl.
- H04N 9/69 (2006.01)
- H04N 5/232 (2006.01)
- H04N 5/225 (2006.01)
- G06K 9/62 (2006.01)
- G06T 7/00 (2006.01)
- H04N 9/07 (2006.01)
- H04N 17/00 (2006.01)

(52) U.S. Cl.
CPC ........ H04N 5/23219 (2013.01); G06K 9/6202 (2013.01); G06T 7/0018 (2013.01); H04N 5/2256 (2013.01); H04N 9/07 (2013.01); H04N 17/002 (2013.01)

(58) Field of Classification Search
CPC ........... H04N 5/23219; H04N 5/2256; H04N 5/2352; H04N 9/69; H04N 9/07; G06K 9/6202; G06T 7/0018
See application file for complete search history.

(56) References Cited

U.S. PATENT DOCUMENTS

| 6,678,407 B1 | 1/2004 | Tajima |
| 7,616,233 B2 | 11/2009 | Steinberg et al. |
| 7,844,076 B2 | 11/2010 | Corcoran et al. |
| 8,200,036 B2 | 6/2012 | Yen et al. |
| 8,265,399 B2 | 9/2012 | Steinberg et al. |
| 8,305,459 B2 | 11/2012 | Kanemitsu et al. |
| 8,331,715 B2 | 12/2012 | Steinberg et al. |
| 8,761,449 B2 | 6/2014 | Steinberg et al. |
| 2006/0203107 A1* | 9/2006 | Steinberg ............... H04N 5/232 348/239 |
| 2006/0204056 A1* | 9/2006 | Steinberg .................. G06T 5/00 382/118 |
| 2012/0308130 A1* | 12/2012 | Barron .................... H04N 9/646 382/167 |
| 2014/0240536 A1 | 8/2014 | Kanemitsu et al. |

OTHER PUBLICATIONS

"Still Image Shooting Functions", Published on: Feb. 9, 2012 Available at: http://imaging.nikon.com/lineup/dslr/d800/features03.htm.
"Digital SLR Camera Nikon D90", Published on: Aug. 27, 2008 Available at: http://www.nikon.com/news/2008/0827_d90_01.htm.
"Controlling the White Balance of PGR Imaging Products", Feb. 23, 2015 Available at: http://www.ptgrey.com/KB/10251.

* cited by examiner

Primary Examiner — Tuan Ho
(74) Attorney, Agent, or Firm — Judy Yee; Micky Minhas

(57) ABSTRACT

A device and a method for dynamically correcting camera module sensitivity variation using face data are disclosed. The method includes accessing a digital image frame of a scene where the digital image frame originates from a camera module. In response to detection of a face area in the digital image frame, a face chromaticity is calculated from the face area detected in the digital image frame by a processor. The method further includes determining a lighting condition at the scene associated with the digital image frame. Further, the method includes comparing the face chromaticity with a reference face chromaticity associated with the lighting condition to determine a chromaticity gain shift. Thereafter, the method includes correcting a gray point curve of the camera module based on the chromaticity gain shift to obtain a corrected gray point curve of the camera module.

20 Claims, 4 Drawing Sheets

METHODS AND DEVICES FOR CORRECTION OF CAMERA MODULE SENSITIVITY AND FLASH COLOR VARIATION

BACKGROUND

Presently, image/video capturing features are present in many electronic devices such as mobile devices and other hand-held devices. Camera modules are present in such devices for image/video capture purposes. As these electronic devices are produced on a mass scale, imaging performance of the camera modules may suffer due to production variation of components of the camera modules. For instance, color channel sensitivity variation, and the like in the camera modules, may be caused by production variation of, among other things, of color filters and image sensors and optics.

The variation in color channel sensitivity and the flash color variation can be measured in individual camera modules during their production, and the measurement data can be stored in camera memories associated with the camera modules. However such measurement and memory requirement have time and money constraints, and even different device manufacturers can use different methods and ways for storing measurement data. Therefore, it is desirable to remove the need for measurement by dynamically being able to calibrate the camera modules either during production or during their operation by the customers.

The embodiments described below are not limited to implementations which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, a method is presented for dynamically correcting camera module sensitivity variation using human face data. The method includes accessing at least one digital image frame of a scene where the digital image frame originates from a camera module. In response to detection of a face area in the digital image frame, a face chromaticity is calculated from the face area detected in the digital image frame by a processor. The method further includes determining a lighting condition at the scene associated with the digital image frame. Further, the method includes comparing the face chromaticity with a reference face chromaticity associated with the lighting condition to determine a chromaticity gain shift. Thereafter, the method includes correcting a gray point curve of the camera module based on the chromaticity gain shift to obtain a corrected gray point curve of the camera module.

In another embodiment, a device is presented for dynamically correcting camera module sensitivity variation in a camera module by using face data generated by the camera module. The device includes a camera module for generating a digital image frame of a scene, and at least one memory including image processing instructions. The device also includes at least one processor communicably coupled with the camera module and the at least one memory. The at least one processor is configured to execute the image processing instructions to at least perform accessing the digital image frame generated from the camera module for face detection in the digital image frame. In response to a detection of a face area in the digital image frame, the at least one processor is configured to calculate a face chromaticity from the face area detected in the digital image frame. The at least one processor is further configured to determine a lighting condition at the scene associated with the digital image frame, and comparing the face chromaticity with a reference face chromaticity for the lighting condition to determine a chromaticity gain shift. Furthermore, the at least one processor is configured to calibrate a gray point curve of the camera module based on the chromaticity gain shift to obtain a calibrated gray point curve for the camera module.

In another embodiment, a device is presented for dynamically correcting flash color variation in a camera module by using face data generated by the camera module. The device includes a camera module for generating a first digital image frame of a scene without using a flash illumination and generating a second digital image frame of the scene by using the flash illumination. The flash illumination is generated from a flash module. The device includes at least one memory including image processing instructions, and at least one processor communicably coupled with the camera module and the at least one memory. The at least one processor is configured to execute the image processing instructions to at least perform accessing the first digital image frame and the second digital image frame. In response to a detection of a face area in the first digital image frame and a face area in the second digital image frame, the at least one processor is configured to calculate a first face chromaticity of the face area detected in the first digital image frame and a second face chromaticity of the face area detected in the second digital image frame. The at least one processor is further configured to determine a reference flash face chromaticity for a reference flash module based on the first face chromaticity, and calculate a chromaticity gain shift between the reference flash face chromaticity and the second face chromaticity. The term 'reference flash face chromaticity' herein represents the face chromaticity under the illumination of the reference flash module. The at least one processor is further configured to calibrate a flash gray point for the flash module based on the chromaticity gain shift to obtain a calibrated flash gray point for the flash module in the camera module.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the following accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
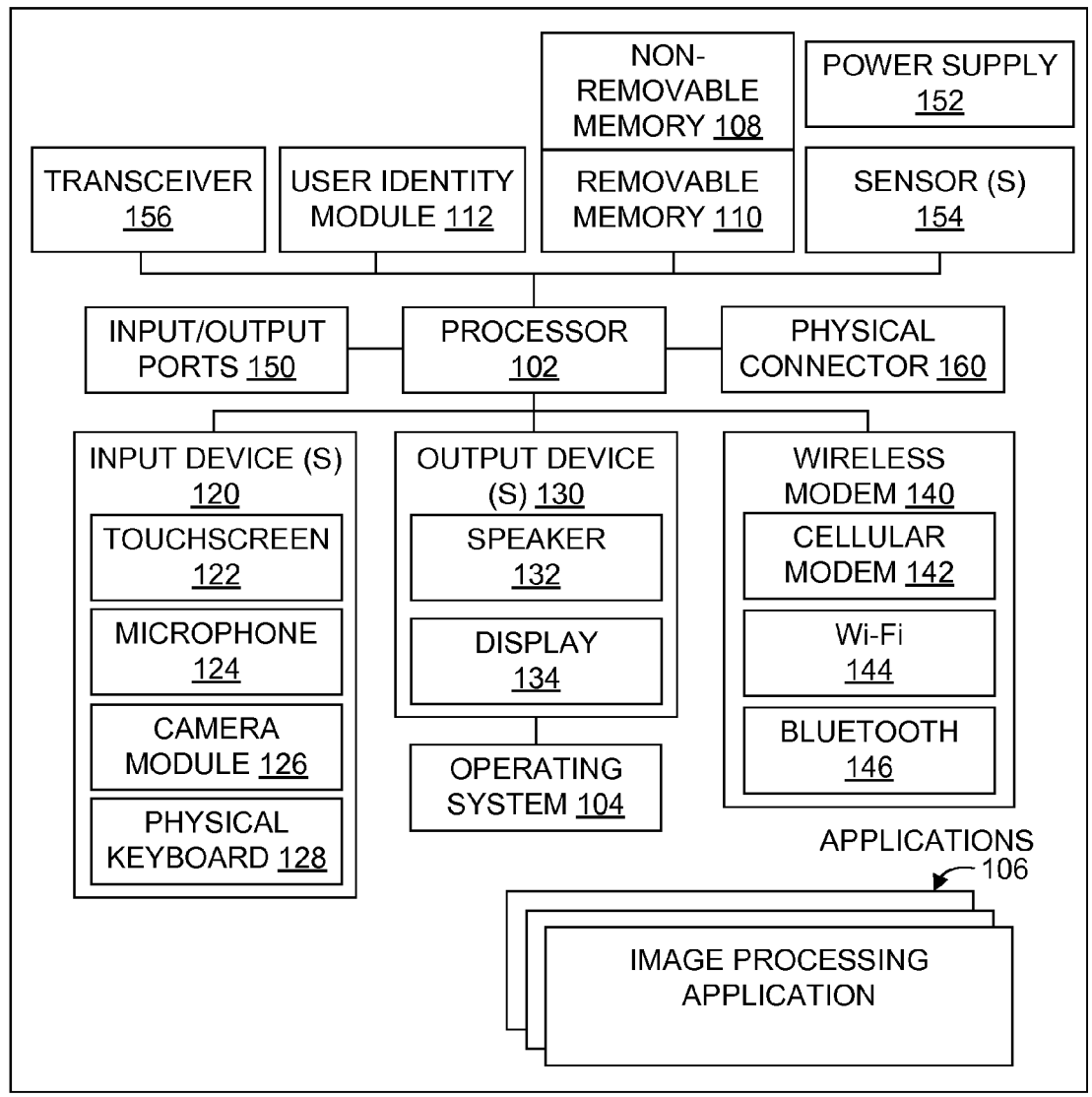
FIG. 1 illustrates an example of an electronic device capable of implementing example embodiments described herein.

FIG. 1 is a schematic block diagram of an electronic device 100 capable of implementing embodiments of the techniques described herein. It should be understood that the electronic device 100 as illustrated and hereinafter described is merely illustrative of one type of device and should not be taken to limit the scope of the embodiments. As such, it should be appreciated that at least some of the components described below in connection with the electronic device 100 may be optional and thus in an example embodiment may include more, less or different components than those described in connection with the example embodiment of FIG. 1. As such, among other examples, the electronic device 100 could be any of mobile electronic devices, for example, personal digital assistants (PDAs), mobile televisions, gaming devices, cellular phones, all types of computers (e.g., laptops, mobile computers or desktops), cameras, mobile digital assistants, or any combination of the aforementioned, and other types of communication or multimedia devices.

The illustrated electronic device 100 includes a controller or a processor 102 (e.g., a signal processor, microprocessor, ASIC, or other control and processing logic circuitry) for performing such tasks as signal coding, data processing, image processing, input/output processing, power control, and/or other functions. An operating system 104 controls the allocation and usage of the components of the electronic device 100 and support for one or more application programs (see, applications 106), such as image processing application (e.g., face tracking and post-processing application) that implements one or more of the innovative features described herein. In addition to image processing application, the application programs can include common mobile computing applications (e.g., telephony applications, email applications, calendars, contact managers, web browsers, messaging applications) or any other computing application.

The illustrated device 100 includes one or more memory components, for example, a non-removable memory 108 and/or removable memory 110. The non-removable memory 108 can include RAM, ROM, flash memory, a hard disk, or other well-known memory storage technologies. The removable memory 110 can include flash memory, smart cards, or a Subscriber Identity Module (SIM). The one or more memory components can be used for storing data and/or code for running the operating system 104 and the applications 106. Example of data can include web pages, text, images, sound files, image data, video data, or other data sets to be sent to and/or received from one or more network servers or other devices via one or more wired or wireless networks. The electronic device 100 may further include a user identity module (UIM) 112. The UIM 112 may be a memory device having a processor built in. The UIM 112 may include, for example, a subscriber identity module (SIM), a universal integrated circuit card (UICC), a universal subscriber identity module (USIM), a removable user identity module (R-UIM), or any other smart card. The UIM 112 typically stores information elements related to a mobile subscriber. The UIM 112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA1000, wideband CDMA (WCDMA) and time division-synchronous CDMA (TD-SCDMA), or with fourth-generation (4G) wireless communication protocols such as LTE (Long-Term Evolution).

The electronic device 100 can support one or more input devices 120 and one or more output devices 130. Examples of the input devices 120 may include, but are not limited to, a touchscreen 122 (e.g., capable of capturing finger tap inputs, finger gesture inputs, multi-finger tap inputs, multi-finger gesture inputs, or keystroke inputs from a virtual keyboard or keypad), a microphone 124 (e.g., capable of capturing voice input), a camera module 126 (e.g., capable of capturing still picture images and/or video images) and a physical keyboard 128. Examples of the output devices 130 may include, but are not limited to a speaker 132 and a display 134. Other possible output devices (not shown) can include piezoelectric or other haptic output devices. Some devices can serve more than one input/output function. For example, the touchscreen 122 and the display 134 can be combined into a single input/output device.

In an embodiment, the camera module 126 may include a digital camera capable of forming a digital image file from a captured image. In some implementations, the camera module 126 may include two or more cameras, for example, a front camera and a rear camera positioned on two sides of the electronic device 100 (e.g., in a mobile device). As such, the camera module 126 includes all hardware, such as a lens or other optical component(s), and software for creating a digital image file from a captured image. Alternatively, the camera module 126 may include the hardware needed to view an image, while a memory device of the electronic device 100 stores instructions for execution by the processor 102 in the form of a software to create a digital image file from a captured image. In an example embodiment, the camera module 126 may further include a processing element such as a co-processor, which assists the processor 102 in processing image data and an encoder and/or decoder for compressing and/or decompressing image data. In an embodiment, the camera module 126 may provide live image data (viewfinder image data) to the display 134.

In an embodiment, the electronic device 100 may comprise a wireless modem 140. The wireless modem 140 can be coupled to one or more antennas (not shown) and can support two-way communications between the processor 102 and external devices, as is well understood in the art. The wireless modem 140 is shown generically and can include, for example, a cellular modem 142 for communicating at long range with the mobile communication network, a Wi-Fi-compatible modem 144 for communicating at short range with an external Bluetooth-equipped device or a local wireless data network or router, and/or a Bluetooth-compatible modem 146. The wireless modem 142 is typically configured for communication with one or more cellular networks, such as a GSM/3G network for data and voice communications within a single cellular network, between cellular networks, or between the mobile device and a public switched telephone network (PSTN).

The electronic device 100 can further include one or more input/output ports 150, a power supply 152, one or more sensors 154 for example, an accelerometer, a gyroscope, a compass, or an infrared proximity sensor for detecting the orientation or motion of the electronic device 100, a transceiver 156 (for wirelessly transmitting analog or digital signals) and/or a physical connector 160, which can be a USB port, IEEE 1394 (FireWire) port, and/or RS-232 port. The illustrated components are not required or all-inclusive, as any of the components shown can be deleted and other components can be added.

With the image processing applications and/or other software or hardware components, the electronic device 100 can implement the technologies described herein. For example, the processor 102 can facilitate capture of images or image frames of a scene through the camera 126 and perform post-processing of the captured image frames.

Although the electronic device 100 is illustrated in FIG. 1 in form of a smartphone, but more particularly, the techniques and solutions described herein can be implemented with connected devices having other screen capabilities and device form factors, such as a tablet computer, a virtual reality device connected to a mobile or desktop computer, an image sensor attached to a gaming console or television, and the like.

Figure 2:
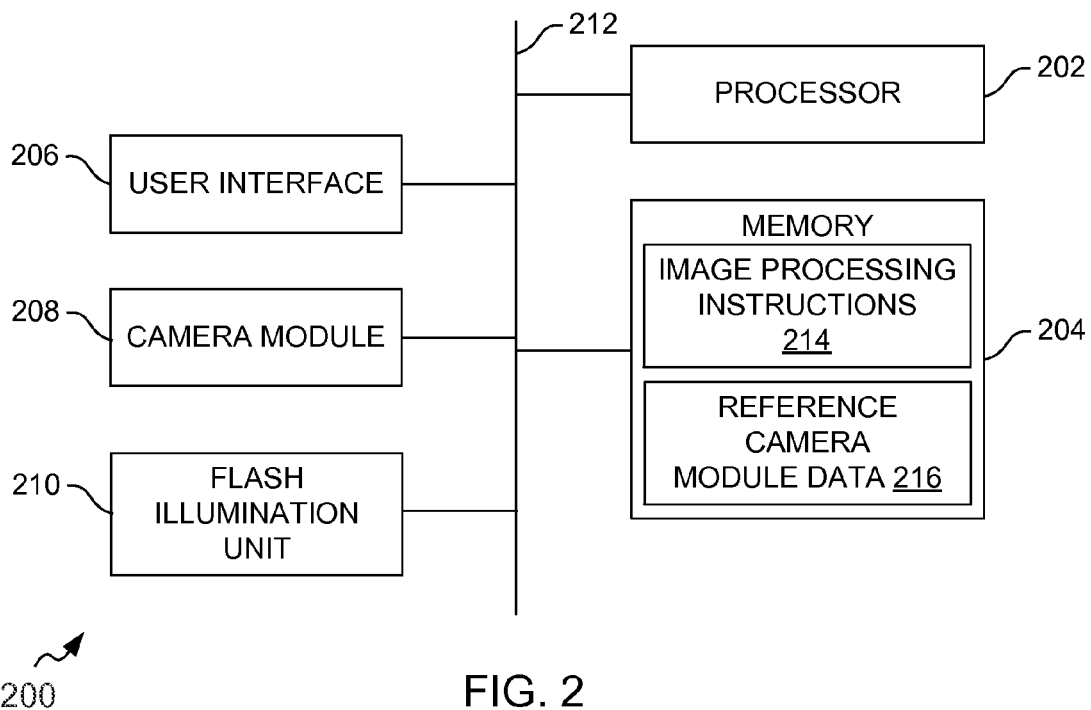
FIG. 2 is an example block diagram of a device for dynamic correction of camera module sensitivity variation and flash color variation using face data in accordance with an example embodiment.

FIG. 2 illustrates a device 200 for dynamic correction of camera module sensitivity variation and flash color variation using face data, in accordance with an example embodiment. The device 200 may be employed, for example, in the electronic device 100 of FIG. 1. However, it should be noted that the device 200, may also be employed on a variety of other devices both mobile and fixed, and therefore, embodiments should not be limited to application on devices such as the electronic device 100 of FIG. 1. Alternatively, embodiments may be employed on a combination of devices including, for example, those listed above. Accordingly, various embodiments may be embodied wholly at a single device, for example, the electronic device 100 or in a combination of devices. Furthermore, it should be noted that the devices or elements described below may not be mandatory and thus some may be omitted in certain embodiments.

The device 200 includes at least one processor for example, a processor 202 and at least one memory, for example a memory 204. Examples of the memory 204 include, but are not limited to, volatile and/or non-volatile memories. For instance, the memory 204 may be volatile memory (e.g., registers, cache, RAM), non-volatile memory (e.g., ROM, EEPROM, flash memory, etc.), or some combination of the two. The memory 204 stores software, for example, image processing instructions 214 that can, for example, implement the technologies described herein, upon execution. For example, the memory 204 may be configured to store information, data, applications, instructions or the like for enabling the device 200 to carry out various functions in accordance with various example embodiments.

An example of the processor 202 may be the processor 102 of FIG. 1. The processor 202 may be embodied in a number of different ways. In an embodiment, the processor 202 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

A user interface 206 may be in communication with the processor 202. Examples of the user interface 206 include, but are not limited to, input interface and/or output interface. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the processor 202 may control at least some functions of one or more elements of the user interface 206, such as, for example, a speaker, ringer, microphone, display, and/or the like. The processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the device 200 includes one or more camera modules, for example a camera module 208, and a flash illumination unit 210 configured to work in combination with the camera module 208. The camera module 208 may be an example of at least one camera module such as the camera module 126 of the electronic device 100. In the device 200, the camera module 208 may be a primary and/or a secondary camera. The camera module 208 is in communication with the processor 202 and/or other components of the device 200 and is configured to capture digital images, videos and/or other graphic media. The camera module 208 may include one or more image sensors including, but not limited to, complementary metal-oxide semiconductor (CMOS) image sensor, charge-coupled device (CCD) image sensor, and the like.

These components 202-210 illustrated in FIG. 2 may communicate with each other via a centralized circuit system or bus 212 to facilitate correction of camera module sensitivity variation and flash color variation using face data in the device 200. The centralized circuit system 212 may be various devices configured to, among other things, provide or enable communication between the components 202-210 of the device 200, or it may be a bus 212 over which the components 202-210 may communicate. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

Various example embodiments use face detection information (also referred to as 'face data') in images captured by the camera module 208 and automatic white balancing (AWB) parameters associated with a reference camera module (also referred to as the golden camera module), to make corrections for the camera module sensitivity variation and flash color variation in the camera module 208. Some example embodiments are hereinafter described with reference to FIG. 2 and FIGS. 3 and 4. Throughout the description, the terms 'reference camera module' and the 'golden camera module' are used interchangeably, and the 'AWB parameters' are also used interchangeably in place of 'gray point curve' (information of gray points for the golden camera module). Further, the term 'face chromaticity', unless the context suggests otherwise, represents the face color of a face area in a suitable color space representation.

In an example embodiment, the processor 202 is configured to, execute the image processing instructions to access at least one digital image frame of a scene, where the at least one digital image frame is originated from the camera module 208. Herein, the 'scene' refers to a sorted/assorted, natural or manmade arrangement of one or more objects, of which images and/or videos can be captured. In an example embodiment, the processor 202 can access the at least one digital image frame by facilitating capture of the scene by the camera module 208. In another example embodiment, the processor 202 can even access the at least one digital image frame from a viewfinder image data of the scene originated from the camera module 208. Accordingly, for the purposes of this description, the at least one digital frame may be considered as 'at least one captured image' or a 'viewfinder image data'. At any particular point of time, a viewfinder image data may be considered a single digital image frame. Herein, the 'viewfinder image data' generally represents image information associated with a continuous viewing of the scene by an image sensor, and that can be simultaneously displayed at a viewfinder (e.g., a display) associated with the camera module 208. In an example embodiment, the processor 202 is configured to facilitate generation of the at least one digital image frame in a known lighting (or illumination) condition of the scene. For instance, the flash illumination unit 210 may be configured to produce a known lighting condition at the scene. In an example embodiment, the processor can access multiple digital image frames based on capturing video or viewfinder image data. Various example embodiments can also be applied for a video data. For instance, when accessing the video data, multiple digital image frames can be of the same subject and captured under same lighting conditions. Accordingly, the processor 202 may calculate an average of the face chromaticities or of the chromaticity gain shifts of the multiple digital image frames for processing thereof.

In an example embodiment of correcting the camera module sensitivity variation, the processor 202 is configured to execute the image processing instructions 214 stored in the memory 204, to detect one or more faces in the at least one digital image frame. The processor 202 may use suitable face detection software or algorithms to detect faces in the at least one digital image frame. Examples of the face detection algorithms include, but are not limited to, eigenface scheme, local feature analysis (LFA), graph matching, neural network scheme, constrained mutual subspace scheme, perturbation space scheme and frequency analysis.

In an example embodiment, if a face is detected in the digital image frame, the processor 202 is configured to calculate a face chromaticity from a face area of a face detected in the digital image frame. Herein, without loss of generality, term 'face area' may refer to an area within which a face is located that is detected by the face detection. 'Face area' may be a box bigger than the skin area of the face and can include hair and some area outside the face (background clothes etc.). Face chromaticity can be determined by averaging pixels in the area. Filtering may be applied on such a 'face area' to reduce it to the skin area. Filtering can be done by for example masking out pixels that do not have a chromaticity within an expected face color range (including camera module variation). Filtering may also be done by taking an estimate of the skin area from face tracker based on eyes, nose and mouth location. Face chromaticity can then be obtained by an average pixel value of this known face skin area. 'Face area' may herein also refer to as the skin area or part of the skin area, where the skin area may be obtained as explained in this paragraph. Herein, without loss of generality, term 'face chromaticity' refers to face color in a color space, for example, in an R/G, B/G color space representation. In an example, the face color may represent average color value of the pixels present in the face area. Considering a scenario where a face area (F1) is detected in the digital image frame (e.g., image I1), the processor 202 is configured to calculate a face chromaticity (C1) from the face area F1 detected in the image I1. In an embodiment the term 'face chromaticity' refers to face skin color without a color luminance component being considered. In another embodiment, color luminance can be included in calculating face chromaticity.

The processor 202 is also configured to determine a lighting condition at the scene associated with the digital image frame. For instance, the lighting condition at the scene when the digital image frame is captured or when a viewfinder image data associated with the digital image frame is generated, is determined by the processor 202. Lighting condition can be determined from the image frame and or including previous imaging frames based on white balance. This may be done by an automatic white balance (AWB) algorithm stored in the image processing instructions 214. In an example embodiment lighting condition may be determined by estimation from the face chromaticity. In an example embodiment, lighting condition may be determined by a separate sensor that may be an RGB sensor or an infrared (IR) sensor. In an example embodiment, there may be various lighting conditions either present at the scene or generated from the flash illumination unit 210. Some non-exhaustive examples of the lighting conditions (illuminations) that may be used to capture the image I1 include a D65 daylight illuminant which corresponds to noon daylight and has a color temperature of 6504 degrees, a TL84 fluorescent lamp with a color temperature of 4000 K, a cool white fluorescent (CWF) lamp with a color temperature of 4230 degrees K, and light source A (incandescent tungsten) with a color temperature of 2856 K.

In an example embodiment of correcting the camera module sensitivity variation, the processor 202 is also configured to compare the face chromaticity with a reference face chromaticity for the determined lighting condition to determine a chromaticity gain shift. In an example embodiment, the reference face chromaticity is associated with the reference camera module (e.g., the golden camera module) that is calibrated for white balancing under various lighting conditions, and its AWB (automatic white balancing) parameters, for example, gray point curve and face color values are defined during the tuning process. As a prevalent industry practice, the golden camera modules are calibrated under various lighting conditions, and the resulting AWB parameters (e.g., reference camera module data 216 as shown in FIG. 2) are stored in memory 204. Hence, reference face chromaticities for various lighting conditions are already stored in the camera memory 204, e.g. in reference camera module data 216, so as to be accessible to the camera module 208.

Based on the comparison of the face chromaticity (obtained in the image I1) and the reference face chromaticity, the processor 202 is configured to determine the chromaticity gain shift (G1). The processor 202 is further configured to execute the image processing instructions 214 to calibrate a gray point curve of the camera module 208 based on the chromaticity gain shift (G1) to obtain a calibrated gray point curve for the camera module 208. In an example embodiment, the processor 202 is configured to determine additional faces in the digital image frame (I1) or in other digital image frames (I2, I3 . . . In) in one or more lighting conditions in a sequential manner to determine additional face chromaticities, and compare the additional face chromaticities with respective reference face chromaticities to determine the additional chromaticity gain shifts (e.g., G2, G3 . . . Gn) in a sequential manner. Further, based on the values of the chromaticity gain shifts (e.g., G1, G2 . . . Gn), the gray point curve (a gray point curve shipped with the camera module 208) of the camera module 208 is corrected to obtain the calibrated gray point curve for the camera module 208. An example representation of the calibration of the gray point curve of the camera module 208 is described with reference to FIG. 3.

Figure 3:
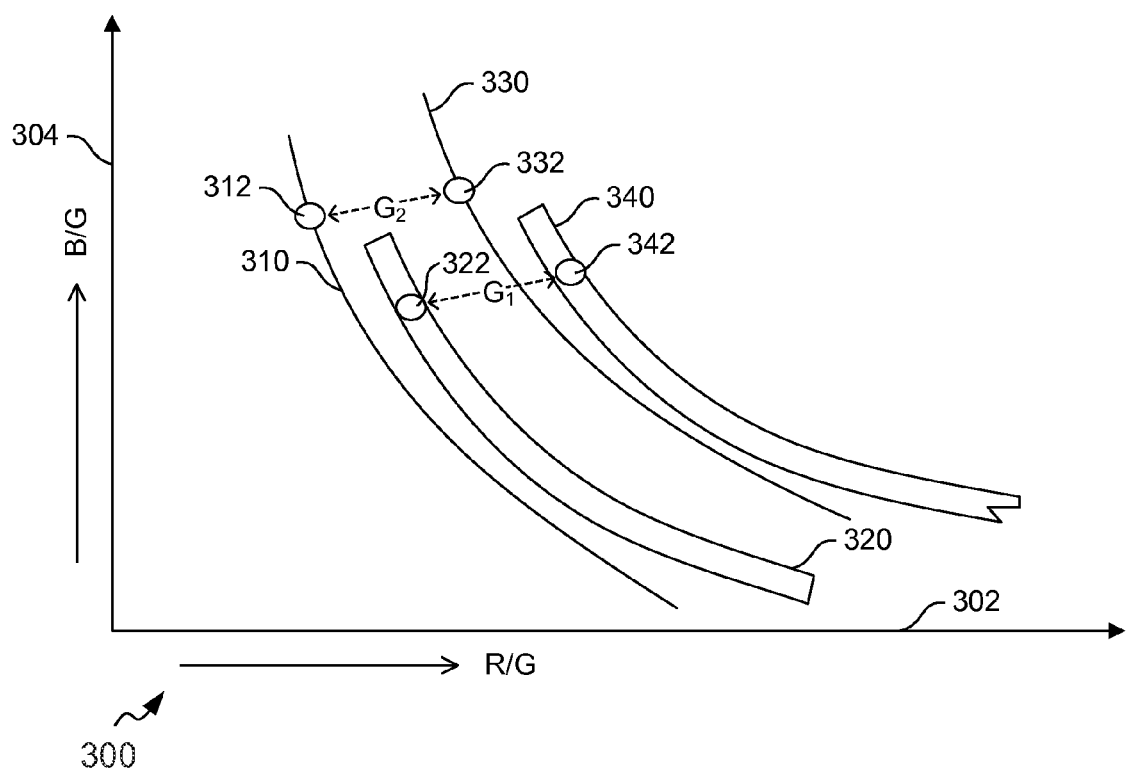
FIG. 3 is a diagram illustrating example representation of correction of camera module sensitivity variation in a camera module, in accordance with an example embodiment.

FIG. 3 is a diagram illustrating example representation 300 of white balancing parameters for correcting camera module sensitivity variation, in accordance with an example embodiment. In this example representation 300, automatic white balancing (AWB) parameters are represented in an R/G, B/G color space along two axes 302 and 304. In this example representation, the axis 302 represents a ratio of Red and Green (see, R/G) color values, and the axis 304 represents of a ratio of Blue and Green (see, B/G) color values. It is to be understood that color of a pixel may be defined by relative strengths of color components provided by an image sensor, for example, strengths of R, G and B in the RGB image sensors, and ratios R/G and B/G are ratios of respective strengths of the color components.

In an example embodiment, AWB parameters, for example a gray point curve and face color area are predefined for the reference camera module for different lighting conditions. Herein the reference camera module is a golden camera module that is calibrated for white balancing under various lighting conditions, and their respective AWB parameters (e.g., reference camera module data 216 as shown in FIG. 2) are stored in the memory, such as in the reference camera module data 216. In the example representation 300, a gray point curve 310 of the camera module 208 represents a predefined gray point curve, that may be stored in the reference camera module data 216, for various lighting conditions; and a gray point, for example a gray point 312 relates to the golden camera module for the D65 lighting condition. Further, a reference face chromaticity area 320 (e.g., a face color area) of the camera module 208 represents a face chromaticity area under different illuminations defined for the golden camera module during the tuning process.

Considering a scenario where a face image frame (image I1) is captured (or generated) with the camera module 208 in the D65 daylight illumination, and a face area is detected in the image I1, the processor 202 is configured to calculate a face chromaticity from the face area detected in image I1. In this example representation 300, a face chromaticity 342 (e.g., a location of the face color) is shown that can be calculated from the face area detected in the image I1. In this example representation 300, the chromaticity gain shift is shown as 'G1' that represents a chromaticity difference between the face chromaticity 342 calculated for the camera module 208 and a reference face chromaticity 322. Herein, the reference face chromaticity 322 represents a predetermined chromaticity (e.g., a location of the face color for the golden camera module) for the golden camera module for the D65 lighting condition (daylight illumination).

In an example embodiment, a gray point curve 310 of the camera module 208 is calibrated based on the chromaticity gain shift 'G1' to obtain a calibrated gray point curve 330 for the camera module 208. In this example representation 300, a reference gray point 312 (e.g., a reference gray point for the D65 lighting condition) on the gray point curve 310 is corrected to a calibrated gray point 332 on the calibrated gray point curve 330 for the camera module 208. In an example embodiment, a shift value is estimated for the reference gray point 312 of the gray point curve 310 based on a function of the chromaticity gain shift 'G1'. In an example, the shift value may be a multiplication of 'G1' by a constant K, where K can be a constant defined based on factors such as camera manufacturing parameters or usage conditions. In this example representation 300, the shift value is shown as 'G2', where 'G2' is equal to K*G1. Further, the reference gray point 312 is shifted by the shift value 'G2' to obtain the calibrated gray point 332 for the calibrated gray point curve 330. In an example embodiment, the face area may be detected in images captured by the camera module 208 under a plurality of lighting conditions in a sequential manner to obtain other calibrated gray points for the calibrated gray point curve 330. For instance, different face areas that may be detected under images captured by the camera module 208 under the plurality of lighting conditions may be obtained on a face chromaticity area 340, and comparing the face chromaticities of the face chromaticity area 340 with respective references face chromaticities of the references face chromaticity area 320, a plurality of chromaticity gain shifts may be calculated. Thereafter, based on the plurality of chromaticity gain shifts, reference gray points of the gray point curve 310 are calibrated to obtain the calibrated gray point curve 330.

In another example embodiment, the process of calibrating the gray point curve 310 to obtain the calibrated gray point curve 330 includes repeating the calibration process upon detecting additional faces in the image I1, and also performing calibration in additional digital image frames that are captured/generated by the camera module 208 by exposing the scene in additional lighting conditions. For instance, upon detection of the one or more additional face area in the image I1, the processor 202 is configured to calculate one or more face chromaticities (F2, F3 . . . Fn) from the one or more additional face areas. Further, the processor 202 is configured to compare the one or more face chromaticities with corresponding reference face chromaticity (Fr2, Fr3 . . . Frn) to determine one or more chromaticity gain shifts (G2, G3 . . . Gn). Further, in an example embodiment, a reference gray point 312 on the gray point curve 310 is calibrated based on a function of the chromaticity gain shift 'G1' and the one or more chromaticity gain shifts (G2, G3 . . . Gn). For example, an average of the chromaticity gain shifts G1, G2, G3 . . . Gn, may be used to determine a calibrated gray point on a calibrated gray point curve. Similarly, in this example embodiment, other calibrated gray points of the calibrated gray point curve 330 are obtained by capturing the images (I1, I2 . . . In) under various lighting conditions, and performing the operation of determining the chromaticity gain shifts and thereafter calibrating the reference gray points of the gray point curve 310 based on the determined chromaticity gain shifts.

In an example embodiment, the processor 202 is configured to store the calibrated gray point curve 330 at a storage location, for example, the memory 204 for white balancing of the future capture of images by the camera module 208. Accordingly, by storing the AWB parameters (e.g., calibrated gray point curve), white balance is corrected for camera module sensitivity variation in future images that may be captured by the camera module 208.

Various example embodiments also utilize the face data for correcting effects of the flash color variation on images captured by the camera module 208. In one such example embodiment, the processor 202 is configured to capture two digital image frames, for example, an image frame (image I1) captured without flash illumination at the scene and an image frame (image I2) captured with flash illumination on the scene. In this example embodiment, an effect of the flash color variation in the camera module 208 is determined based at least on a comparison of the face chromaticities determined in the image I1 and the image I2. An example representation of correction of the flash color variation is shown in FIG. 4.

Figure 4:
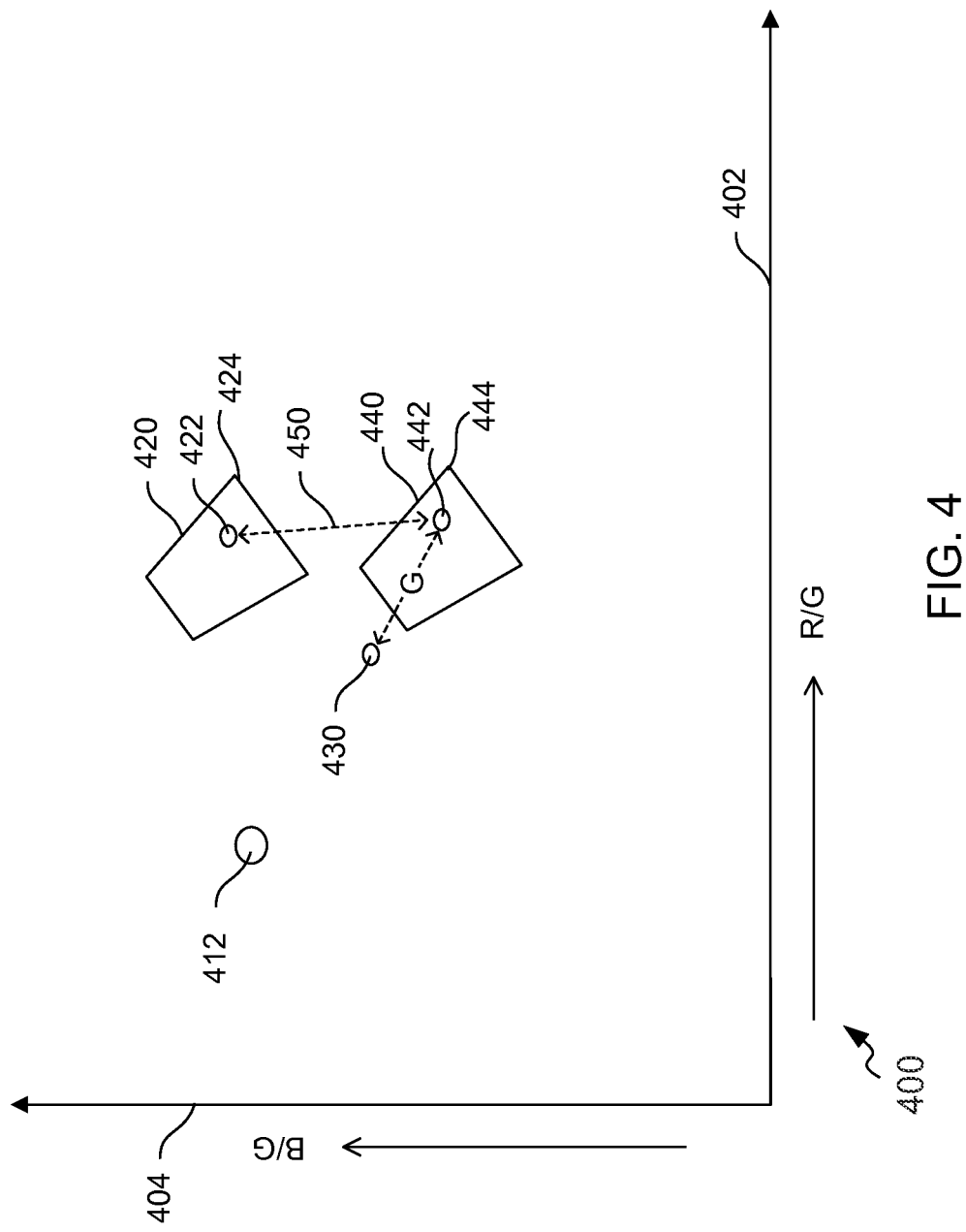
FIG. 4 is a diagram illustrating example representation of correction of flash color variation in the camera module, in accordance with an example embodiment.

FIG. 4 is an example representation 400 of AWB parameters for illustrating correction of flash color variation in the camera module 208, in accordance with an example embodiment. In this example representation 400, AWB parameters are represented in R/G and B/G color space along two axes, 402 and 404. The axis 402 represents a ratio of Red and Green color values (see, R/G), and the axis 404 represents of a ratio of Blue and Green color values (see, B/G).

The representation 400 is herein explained by taking an example of capture of two digital image frames, for example, a first digital image frame (image I1) captured without using a flash illumination and a second digital image frame (image I2) captured using the flash illumination. In this example, the image I2 is generated in a manner such that flash illumination is a dominant illumination on a face area in the scene. The flash illumination can be generated from a flash module (e.g., a flash module present in the flash illumination unit 210), and may be of a particular flash color. The processor 202 is configured to determine face areas in the images I1 and I2.

The processor 202 is configured to determine a first face chromaticity of the face area in the image I1, and first face chromaticity is represented as a face chromaticity 422 in the representation 400. The processor 202 is also configured to determine second face chromaticity of the face area in the image I2, and second face chromaticity is represented as a face chromaticity 430 in the representation 400. The second face chromaticity 430 represents an actual face chromaticity under the flash illumination generated from the flash module.

It should be understood that information of possible face color locations (face box) under a reference flash module in the camera module is already known to the processor 202. For instance, the face box under the reference flash module is shown as a face box 440 in the representation 400, and is hereinafter referred to as 'reference flash face box 440'. Further, a reference gray point is also known to the processor 202 and the reference gray point is represented as a gray point 412 in the representation 400.

The processor 202 is configured to determine lighting condition (e.g., illumination) for the image I1. For example, the processor 202 estimates the illumination for the image I1, and is further configured to determine the corresponding face box under this illumination. Herein, the term 'face box' under an illumination (I) represents an area in the R/G, B/G color space inside which all face chromaticities lie for any face captured under the illumination (I). The corresponding face box for the image I1 is shown as a face box 420 in the representation 400.

The processor 202 is configured to calculate a relative position of the first face chromaticity (see, 422) in the face box 420 for the image I1. For example, a position of the first face chromaticity 422 with respect to a corner 424 of the face box 420 may be determined by the processor 202. The processor 202 is further configured to calculate a corresponding relative position of a reference face chromaticity in the reference flash face box 440 based on information of the relative position of first face chromaticity 422 in the face box 420. As shown in the representation 400, the corresponding relative position of the reference face chromaticity in the reference flash face box 440 is represented by 442, and the correspondence between the relative position 422 and the relative position 442 is shown by reference numeral 450. For instance, the corresponding relative position 442 with respect to a corner 444 of the reference flash face box 400 may be mapped based the position of the first face chromaticity 422 with respect to the corner 424 of the face box 420.

The processor 202 further calculates a chromaticity gain shift between the reference face chromaticity (see, the position 442) and the second face chromaticity 430. The chromaticity gain shift is represented by 'G' in the example representation 400 that represents a required shift value between the reference flash face chromaticity (see, the position 442) and the second face chromaticity 430. The processor 202 is further configured to execute the image processing instructions 214 to calibrate a flash gray point of the camera module 208 based on the chromaticity gain shift (G) to obtain a calibrated flash gray point for specific flash module (e.g., a flash module present in the flash illumination unit 210). For instance, the processor 202 is configured to apply the chromaticity gain shift (G) on the reference flash gray point 412 to determine the estimated gray point for the specific flash module.

Figure 5:
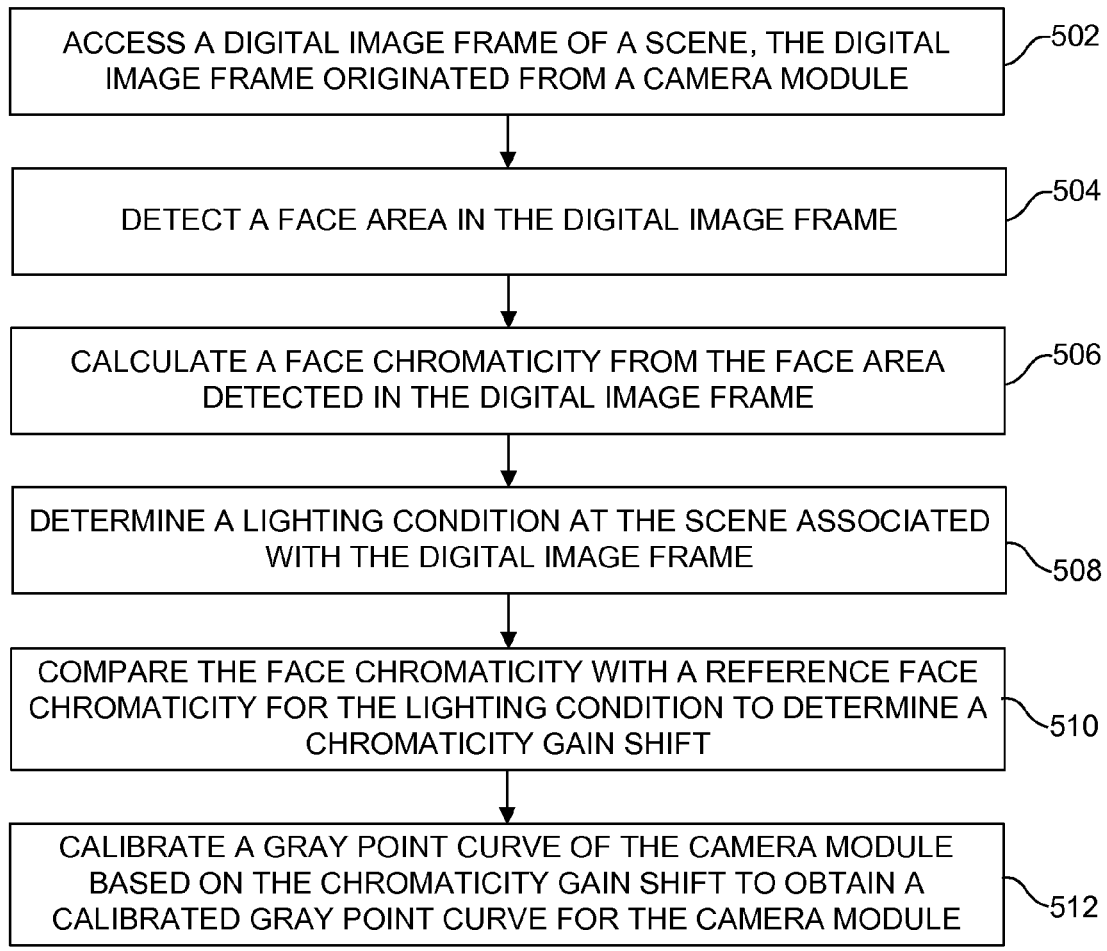
FIG. 5 illustrates an example flow diagram of a method for correcting camera module sensitivity variation, in accordance with an example embodiment.

FIG. 5 illustrates an example flow diagram of a method 500 of correcting camera module sensitivity variation in a camera module, in accordance with an example embodiment. Operations of the method 500 may be performed by, for example, the device 200 of FIG. 2. References of the FIGS. 2 to 4 are used for the description of the method 500.

At 502, the method 500 includes accessing a digital image frame of a scene, where the digital image frame is originating from a camera module (e.g., the camera module 208 of FIG. 2). The digital image frame may be accessed from a captured image from the camera module or may be accessed from a viewfinder image data of the camera module.

At 504, the method 500 includes detecting a face area in the digital image frame. One or more of suitable face detection algorithms or software may be used to detect faces in the digital image frame. Examples of the face detection algorithms include, but are not limited to, eigenface scheme, local feature analysis (LFA), graph matching, neural network scheme, constrained mutual subspace scheme, perturbation space scheme and frequency analysis. At 506, the method 500 includes calculating a face chromaticity from the face area detected in the digital image frame. As explained with reference to FIG. 2, the 'face chromaticity' may refer to face color in a color space, for example, in an R/G, B/G color space representation, or in any other color space representation.

At 508, the method 500 includes determining a lighting condition at the scene associated with the digital image frame. For instance, the lighting condition when the scene is captured or when the image frame data of the scene is accessed at the viewfinder, is determined. At 510, the method 500 includes comparing the face chromaticity with a reference face chromaticity for the lighting condition to determine a chromaticity gain shift. As explained with reference to FIGS. 2 and 3, the reference face chromaticity is readily available or accessible to the camera module. In an example, reference face chromaticities for various lighting conditions are pre-stored in the camera module 208, or are accessible to the camera module 208.

At 512, the method 500 includes calibrating a gray point curve of the camera module based on the chromaticity gain shift to obtain a calibrated gray point curve for the camera module. In an example embodiment, the operation of the block 512 is performed in an iterative process. For example, additional faces are detected in image frames captured by the camera module in one or more lighting conditions. Further, additional face chromaticities are calculated for the detected faces, and the additional face chromaticities are compared with respective reference face chromaticities to determine additional chromaticity gain shifts (e.g., G2, G3 ... Gn). Further, based on the values of the chromaticity gain shifts (e.g., G1, G2 ... Gn), the gray point curve (a gray point curve shipped with the camera module) of the camera module is corrected to obtain the calibrated gray point curve for the camera module.

An embodiment of a method comprises accessing a digital image frame of a scene, the digital image frame originating from a camera module, in response to detecting a face area in the digital image frame, performing by a processor:

calculating a face chromaticity from the face area detected in the digital image frame, determining a lighting condition at the scene associated with the digital image frame, and comparing the face chromaticity with a reference face chromaticity for the lighting condition to determine a chromaticity gain shift, and calibrating a gray point curve of the camera module based on the chromaticity gain shift to obtain a calibrated gray point curve for the camera module.

In one embodiment of the method the reference face chromaticity is a predetermined face chromaticity for the lighting condition in a reference camera module other than the camera module.

In one embodiment of the method, alternatively or in addition, calibrating the gray point curve of the camera module comprises: estimating a shift value for a reference gray point of the gray point curve based on a function of the chromaticity gain shift, and shifting the reference gray point by the shift value to obtain a calibrated gray point for the calibrated gray point curve.

In one embodiment, alternatively or in addition, the method further comprises illuminating the scene with a plurality of lighting conditions in a sequential manner, wherein the chromaticity gain shift is determined for each of the plurality of lighting conditions and the gray point curve of the camera module is calibrated based on the chromaticity gain shift determined for each of the plurality of lighting conditions.

In one embodiment of the method, alternatively or in addition, in response to detecting one or more additional face areas other than the face area in the digital image frame, further performing: calculating one or more face chromaticities from the one or more additional face areas, and comparing the one or more face chromaticities with the reference face chromaticity to determine one or more chromaticity gain shifts, wherein calibrating the gray point curve of the camera module is further based on a function of the chromaticity gain shift and the one or more chromaticity gain shifts.

In one embodiment, alternatively or in addition, the method further comprises storing the calibrated gray point curve for correcting white balance in the camera module.

In one embodiment of the method, alternatively or in addition, accessing the digital image frame comprises at least one of: capturing the digital image frame by the camera module, and accessing a viewfinder image data of the scene from the camera module.

In one embodiment, alternatively or in addition, the method further comprises accessing at least two digital image frames of a scene, calculating the face chromaticity from the face area detected in the at least two digital image frames, and determining a lighting condition at the scene associated with the at least two digital image frames.

An embodiment of a device comprises a camera module for generating a digital image frame of a scene, at least one memory comprising image processing instructions, and at least one processor communicably coupled with the camera module and the at least one memory, the at least one processor configured to execute the image processing instructions to at least perform:

accessing the digital image frame generated from the camera module for face detection in the digital image frame, in response to a detection of a face area in the digital image frame:

calculating a face chromaticity from the face area detected in the digital image frame, determining a lighting condition at the scene associated with the digital image frame, and comparing the face chromaticity with a reference face chromaticity for the lighting condition to determine a chromaticity gain shift, and calibrating a gray point curve of the camera module based on the chromaticity gain shift to obtain a calibrated gray point curve for the camera module.

In one embodiment of the device the reference face chromaticity is a predetermined face chromaticity for the lighting condition in a reference camera module other than the camera module.

In one embodiment of the device, alternatively or in addition, for calibrating the gray point curve of the camera module, the at least one processor is further configured to execute the image processing instructions to at least perform: estimating a shift value for a reference gray point of the gray point curve based on a function of the chromaticity gain shift, and shifting the reference gray point by the shift value to obtain a calibrated gray point for the calibrated gray point curve.

In one embodiment, alternatively or in addition, the device further comprises a flash illumination unit for illuminating the scene with a plurality of lighting conditions in a sequential manner, wherein the at least one processor is configured to determine the chromaticity gain shift for each of the plurality of lighting conditions and to calibrate the gray point curve of the camera module based on the chromaticity gain shift determined for each of the plurality of lighting conditions.

In one embodiment of the device, alternatively or in addition, the at least one processor is further configured to execute the image processing instructions to:

detect one or more additional face areas other than the face area in the digital image frame; and in response to detecting the one or more additional face area:

calculating one or more face chromaticities from the one or more additional face areas; and comparing the one or more face chromaticities with the reference face chromaticity to determine one or more chromaticity gain shifts, wherein calibrating the gray point curve of the camera module is further based on a function of the chromaticity gain shift and the one or more chromaticity gain shifts.

In one embodiment of the device, alternatively or in addition, the at least one memory is configured to store the calibrated gray point curve for correcting white balance in the camera module.

In one embodiment of the device, alternatively or in addition, the at least one processor is configured to access the digital image frame by at least one of: facilitating capture of the digital image frame by the camera module, and accessing a viewfinder image data of the scene from the camera module.

Another example of a device comprises a camera module for generating a first digital image frame of a scene without using a flash illumination and generating a second digital image frame of the scene by using the flash illumination, the flash illumination generated from a flash module;

at least one memory comprising image processing instructions, and at least one processor communicably coupled with the camera module and the at least one memory, the at least one processor configured to execute the image processing instructions to at least perform:
  accessing the first digital image frame and the second digital image frame,
  in response to a detection of a face area in the first digital image frame and a face area in the second digital image frame:
    calculating a first face chromaticity of the face area detected in the first digital image frame and a second face chromaticity of the face area detected in the second digital image frame,
    determining a reference flash face chromaticity for a reference flash module based on the first face chromaticity, and
  calculating a chromaticity gain shift between the reference flash face chromaticity and the second face chromaticity, and
  calibrating a flash gray point for the flash module based on a reference flash gray point and the chromaticity gain shift to obtain a calibrated flash gray point for the flash module in the camera module.

In one embodiment of the device the second digital frame is generated in a manner such that the flash illumination is a dominant illumination on a face corresponding to the face area in the second digital frame image.

In one embodiment of the device, alternatively or in addition, the at least one processor is configured to determine the reference flash face chromaticity by: determining an illumination for the first digital image frame, determining a face box corresponding to the illumination for the first digital image frame, the face box associated with likelihood areas of face chromaticity under the illumination, calculating a relative position of the first face chromaticity within the face box for the first digital image frame, and calculating the reference flash face chromaticity within a reference flash face box based on the relative position of the first face chromaticity within the face box, wherein information of the reference flash face box is available to the at least one processor.

In one embodiment, alternatively or in addition, the device further comprises a flash illumination unit for illuminating the scene with a plurality of lighting conditions in a sequential manner, and wherein the at least one processor is configured to determine the chromaticity gain shift for each of the plurality of lighting conditions and configured to calibrate the flash gray point based on the chromaticity gain shift determined for each of the plurality of lighting conditions.

In one embodiment of the device, alternatively or in addition, the at least one memory is configured to store the flash gray point for correcting flash color variation in the camera module.

Various example embodiments provide methods and devices for correcting camera module sensitivity variation using face data captured from the camera module. As such, the operations and functionalities described in various embodiments are not limited to devices described herein, but can be implemented in any suitable manner including processors capable of executing the instructions. For instance, in an example embodiment, a device includes a means and/or function for accessing a digital image frame of a scene where the digital image frame originates from a camera module. Herein, the means and/or function for accessing the digital image frame may be an example of a processor such as the processor 202, or even the camera module embodying processing means, that operates together with software or processing instructions 214 stored in the memory 204. The device also includes means and/or functionality for calculating a face chromaticity from the face area detected in the digital image frame. An example of the means and/or functionality for calculating the face chromaticity includes the processor 202.

The device also includes means and/or functionality for determining a lighting condition at the scene associated with the digital image frame. Examples of the means and/or functionality for determining lighting conditions can include the processor, one or more sensors for sensing the lighting conditions, flash illumination unit and a memory including the lighting conditions data. The device also includes a means and/or functionality for comparing the face chromaticity with a reference face chromaticity for the lighting condition to determine a chromaticity gain shift and means and/or functionality for calibrating a gray point curve of the camera module based on the chromaticity gain shift to obtain a calibrated gray point curve for the camera module. Examples of the means and/or functionality for comparing the face chromaticity with a reference face chromaticity and calibrating a gray point curve of the camera module may be the processor 202 operating together with software and instructions in the memory 204.

Various example embodiments offer, among other benefits, dynamic correction for camera module sensitivity variation and flash color variation in a camera module using face data generated from the camera module. Such example embodiments preclude the need of storing camera module sensitivity variation and flash color information for each individual camera modules, and rather use the face capture information by the camera module to make corrections for the camera module sensitivity variation and the flash color variation. Such example embodiments make corrections by taking into account a plurality of face captures by the camera module in various lighting conditions, thereby providing a reliable future image capture by the camera module. However, in other example embodiments, as has been described herein, camera module sensitivity variation and flash color information for each individual camera module is stored, and the face capture information by the camera module is used to make corrections for the camera module sensitivity variation and flash color variation. Accordingly, various example embodiments are capable of dynamically calibrating the camera modules during operation by customers themselves, thereby making the calibration process easy to be performed, and calibration may be repeated by customers. Exemplary embodiments also enable dynamic correction for camera module sensitivity variation and flash color variation in a camera module during production of a camera module.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

Alternatively, or in addition, the functionality described herein (such as the image processing instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

It will be understood that the benefits and advantages described above may relate to one embodiment or may relate to several embodiments. The embodiments are not limited to those that solve any or all of the stated problems or those that have any or all of the stated benefits and advantages.

The steps of the methods described herein may be carried out in any suitable order, or simultaneously where appropriate. Additionally, individual blocks may be added or deleted from any of the methods without departing from the spirit and scope of the subject matter described herein.

Aspects of any of the examples described above may be combined with aspects of any of the other examples described to form further examples without losing the effect sought.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method, comprising:
    accessing a digital image frame of a scene, the digital image frame originating from a camera module;
    in response to detecting a face area in the digital image frame, performing by a processor:
        calculating a face chromaticity from the face area detected in the digital image frame;
        determining a lighting condition at the scene associated with the digital image frame; and
        comparing the face chromaticity with a reference face chromaticity for the lighting condition to determine a chromaticity gain shift; and
    calibrating a gray point curve of the camera module based on the chromaticity gain shift to obtain a calibrated gray point curve for the camera module.

2. The method of claim 1, wherein the reference face chromaticity is a predetermined face chromaticity for the lighting condition in a reference camera module other than the camera module.

3. The method of claim 2, wherein calibrating the gray point curve of the camera module comprises:
    estimating a shift value for a reference gray point of the gray point curve based on a function of the chromaticity gain shift; and
    shifting the reference gray point by the shift value to obtain a calibrated gray point for the calibrated gray point curve.

4. The method of claim 1, further comprising illuminating the scene with a plurality of lighting conditions in a sequential manner, wherein the chromaticity gain shift is determined for each of the plurality of lighting conditions and the gray point curve of the camera module is calibrated based on the chromaticity gain shift determined for each of the plurality of lighting conditions.

5. The method of claim 1, in response to detecting one or more additional face areas other than the face area in the digital image frame, further performing:
    calculating one or more face chromaticities from the one or more additional face areas; and
    comparing the one or more face chromaticities with the reference face chromaticity to determine one or more chromaticity gain shifts,
    wherein calibrating the gray point curve of the camera module is further based on a function of the chromaticity gain shift and the one or more chromaticity gain shifts.

6. The method of claim 1, further comprising storing the calibrated gray point curve for correcting white balance in the camera module.

7. The method of claim 1, wherein accessing the digital image frame comprises at least one of:

capturing the digital image frame by the camera module; and accessing a viewfinder image data of the scene from the camera module.

8. The method of claim 1, further comprising accessing at least two digital image frames of a scene, calculating the face chromaticity from the face area detected in the at least two digital image frames, and determining a lighting condition at the scene associated with the at least two digital image frames.

9. A device, comprising:
a camera module for generating a digital image frame of a scene;
at least one memory comprising image processing instructions; and
at least one processor communicably coupled with the camera module and the at least one memory, the at least one processor configured to execute the image processing instructions to at least perform:
accessing the digital image frame generated from the camera module for face detection in the digital image frame;
in response to a detection of a face area in the digital image frame:
calculating a face chromaticity from the face area detected in the digital image frame;
determining a lighting condition at the scene associated with the digital image frame; and
comparing the face chromaticity with a reference face chromaticity for the lighting condition to determine a chromaticity gain shift; and
calibrating a gray point curve of the camera module based on the chromaticity gain shift to obtain a calibrated gray point curve for the camera module.

10. The device of claim 9, wherein the reference face chromaticity is a predetermined face chromaticity for the lighting condition in a reference camera module other than the camera module.

11. The device of claim 10, wherein for calibrating the gray point curve of the camera module, the at least one processor is further configured to execute the image processing instructions to at least perform:
estimating a shift value for a reference gray point of the gray point curve based on a function of the chromaticity gain shift; and
shifting the reference gray point by the shift value to obtain a calibrated gray point for the calibrated gray point curve.

12. The device of claim 9, further comprising a flash illumination unit for illuminating the scene with a plurality of lighting conditions in a sequential manner, wherein the at least one processor is configured to determine the chromaticity gain shift for each of the plurality of lighting conditions and to calibrate the gray point curve of the camera module based on the chromaticity gain shift determined for each of the plurality of lighting conditions.

13. The device of claim 9, wherein the at least one processor is further configured to execute the image processing instructions to:
detect one or more additional face areas other than the face area in the digital image frame; and
in response to detecting the one or more additional face area:
calculating one or more face chromaticities from the one or more additional face areas; and comparing the one or more face chromaticities with the reference face chromaticity to determine one or more chromaticity gain shifts,
wherein calibrating the gray point curve of the camera module is further based on a function of the chromaticity gain shift and the one or more chromaticity gain shifts.

14. The device of claim 9, wherein the at least one memory is configured to store the calibrated gray point curve for correcting white balance in the camera module.

15. The device of claim 9, wherein the at least one processor is configured to access the digital image frame by at least one of:
facilitating capture of the digital image frame by the camera module; and
accessing a viewfinder image data of the scene from the camera module.

16. A device, comprising:
a camera module for generating a first digital image frame of a scene without using a flash illumination and generating a second digital image frame of the scene by using the flash illumination, the flash illumination generated from a flash module;
at least one memory comprising image processing instructions; and
at least one processor communicably coupled with the camera module and the at least one memory, the at least one processor configured to execute the image processing instructions to at least perform:
accessing the first digital image frame and the second digital image frame;
in response to a detection of a face area in the first digital image frame and a face area in the second digital image frame:
calculating a first face chromaticity of the face area detected in the first digital image frame and a second face chromaticity of the face area detected in the second digital image frame;
determining a reference flash face chromaticity for a reference flash module based on the first face chromaticity; and
calculating a chromaticity gain shift between the reference flash face chromaticity and the second face chromaticity; and
calibrating a flash gray point for the flash module based on a reference flash gray point and the chromaticity gain shift to obtain a calibrated flash gray point for the flash module in the camera module.

17. The device of claim 16, wherein the second digital frame is generated in a manner such that the flash illumination is a dominant illumination on a face corresponding to the face area in the second digital frame image.

18. The device of claim 17, wherein the at least one processor is configured to determine the reference flash face chromaticity by:
determining an illumination for the first digital image frame;
determining a face box corresponding to the illumination for the first digital image frame, the face box associated with likelihood areas of face chromaticity under the illumination;
calculating a relative position of the first face chromaticity within the face box for the first digital image frame; and
calculating the reference flash face chromaticity within a reference flash face box based on the relative position of the first face chromaticity within the face box, wherein information of the reference flash face box is available to the at least one processor.

19. The device of claim 16, further comprising a flash illumination unit for illuminating the scene with a plurality of lighting conditions in a sequential manner, and wherein the at least one processor is configured to determine the chromaticity gain shift for each of the plurality of lighting conditions and configured to calibrate the flash gray point based on the chromaticity gain shift determined for each of the plurality of lighting conditions.

20. The device of claim 16, wherein the at least one memory is configured to store the flash gray point for correcting flash color variation in the camera module.

\* \* \* \* \*